(12) United States Patent
Cseri et al.

(10) Patent No.: US 11,216,421 B2
(45) Date of Patent: *Jan. 4, 2022

(54) EXTENSIBLE STREAMS FOR OPERATIONS ON EXTERNAL SYSTEMS

(71) Applicant: Snowflake Inc., Bozeman, MT (US)

(72) Inventors: Istvan Cseri, Seattle, WA (US); Tyler Jones, San Francisco, CA (US); Dinesh Chandrakant Kulkarni, Sammamish, WA (US); Igor Zinkovsky, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/345,422

(22) Filed: Jun. 11, 2021

(65) Prior Publication Data

US 2021/0318994 A1     Oct. 14, 2021

Related U.S. Application Data

(63) Continuation of application No. 16/812,940, filed on Mar. 9, 2020, now Pat. No. 11,055,262.

(51) Int. Cl.
*G06F 16/18* (2019.01)
*G06F 16/182* (2019.01)
(Continued)

(52) U.S. Cl.
CPC ...... *G06F 16/1865* (2019.01); *G06F 16/1824* (2019.01); *G06F 16/2322* (2019.01); *G06F 16/24532* (2019.01); *G06F 16/24568* (2019.01)

(58) Field of Classification Search
CPC ............. G06F 16/1865; G06F 16/1824; G06F 16/2322; G06F 16/24532; G06F 16/24568
(Continued)

(56) References Cited

U.S. PATENT DOCUMENTS 6,598,055 B1 * 7/2003 Keesey ................... G06F 16/21
707/769
7,680,875 B1 3/2010 Shopiro et al.
(Continued)

OTHER PUBLICATIONS

"U.S. Appl. No. 16/812,940, Examiner Interview Summary dated Aug. 25, 2020", 3 pgs.
(Continued)

*Primary Examiner* — Hicham Skhoun
(74) *Attorney, Agent, or Firm* — Schwegman Lundberg & Woessner, P.A.

(57) ABSTRACT

The subject technology determines, using a stream object provided by a network-based database system separate from an external system, a set of offsets of each shard of a set of shards, the set of offsets being determined by executing a user defined function (UDF) included in the stream object, the stream object and the UDF being implemented in a particular programming language different than a database query language. The subject technology identifies an operation to perform on the set of shards. The subject technology, based on the set of shards and the set of offsets, performs, using the UDF included in the stream object, the operation on an external data source hosted by the external system. The subject technology increments a property indicating a different version of the stream object after performing the operation on the external data source, the property being included in the stream object.

30 Claims, 9 Drawing Sheets

(51) Int. Cl.
  *G06F 16/2453* (2019.01)
  *G06F 16/2455* (2019.01)
  *G06F 16/23* (2019.01)

(58) Field of Classification Search
  USPC ........................................................ 707/703
  See application file for complete search history.

(56) References Cited

U.S. PATENT DOCUMENTS

| | | | |
|---|---|---|---|
| 2011/0246763 | A1 | 10/2011 | Karnes |
| 2012/0016849 | A1 | 1/2012 | Garrod et al. |
| 2014/0280026 | A1 | 9/2014 | Anderson |
| 2017/0011090 | A1 | 1/2017 | Chen et al. |
| 2018/0217882 | A1 | 8/2018 | Broadhurst et al. |
| 2019/0102421 | A1 | 4/2019 | Sonawane et al. |
| 2020/0125572 | A1* | 4/2020 | Hanckel ................ G06F 16/221 |
| 2020/0167343 | A1 | 5/2020 | Cseri et al. |

OTHER PUBLICATIONS

"U.S. Appl. No. 16/812,940, Final Office Action dated Dec. 17, 2020", 12 pgs.
"U.S. Appl. No. 16/812,940, Non Final Office Action dated Jun. 8, 2020", 9 pgs.
"U.S. Appl. No. 16/812,940, Notice of Allowability dated Jun. 7, 2021", 7 pgs.
"U.S. Appl. No. 16/812,940, Notice of Allowance dated Apr. 14, 2021", 11 pgs.
"U.S. Appl. No. 16/812,940, Response filed Feb. 17, 2021 to Final Office Action dated Dec. 17, 2020", 13 pgs.
"U.S. Appl. No. 16/812,940, Response filed Sep. 3, 2020 to Non Final Office Action dated Jun. 8, 2020", 13 pgs.
"International Application Serial No. PCT/US2021/021516, International Search Report dated Apr. 22, 2021", 3 pgs.
"International Application Serial No. PCT/US2021/021516, Written Opinion dated Apr. 22, 2021", 4 pgs.

* cited by examiner

EXTENSIBLE STREAMS FOR OPERATIONS ON EXTERNAL SYSTEMS

CROSS-REFERENCE TO RELATED APPLICATIONS

This application is a continuation of, and hereby claims priority under 35 U.S.C. § 120 to U.S. Non-Provisional patent application Ser. No. 16/812,940, entitled "EXTENSIBLE STREAMS ON DATA SOURCES," filed on Mar. 9, 2020, which is hereby incorporated by reference herein in its entirety for all purposes.

TECHNICAL FIELD

Embodiments of the disclosure relate generally to databases and, more specifically, to utilizing data stream platforms in order to access data for storage in the databases.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

A cloud data warehouse (also referred to as a "network-based data warehouse" or simply as a "data warehouse") is one type of network-based data system used for data analysis and reporting that comprises a central repository of integrated data from one or more disparate sources. A cloud data warehouse is commonly an online analytical processing (OLAP) database that can store current and historical data that can be used for creating analytical reports for an enterprise, based on data stored within databases of the enterprise. To this end, data warehouses typically provide business intelligence tools, tools to extract, transform, and load data into the repository, and tools to manage and retrieve metadata. There are other types of network-based data systems, such as online transaction processing (OLTP) databases, as well as data systems that operate with characteristics of multiple types of traditional database systems.

When certain information is to be extracted from a database, a query statement may be executed against the database data. A cloud data warehouse system processes the query and returns certain data according to one or more query predicates that indicate what information should be returned by the query. The data. warehouse system extracts specific data from the database and formats that data into a readable form. However, it can be challenging to execute queries on a very large table at least because a significant amount of time and computing resources are required to scan an entire table to identify data that satisfies the query.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
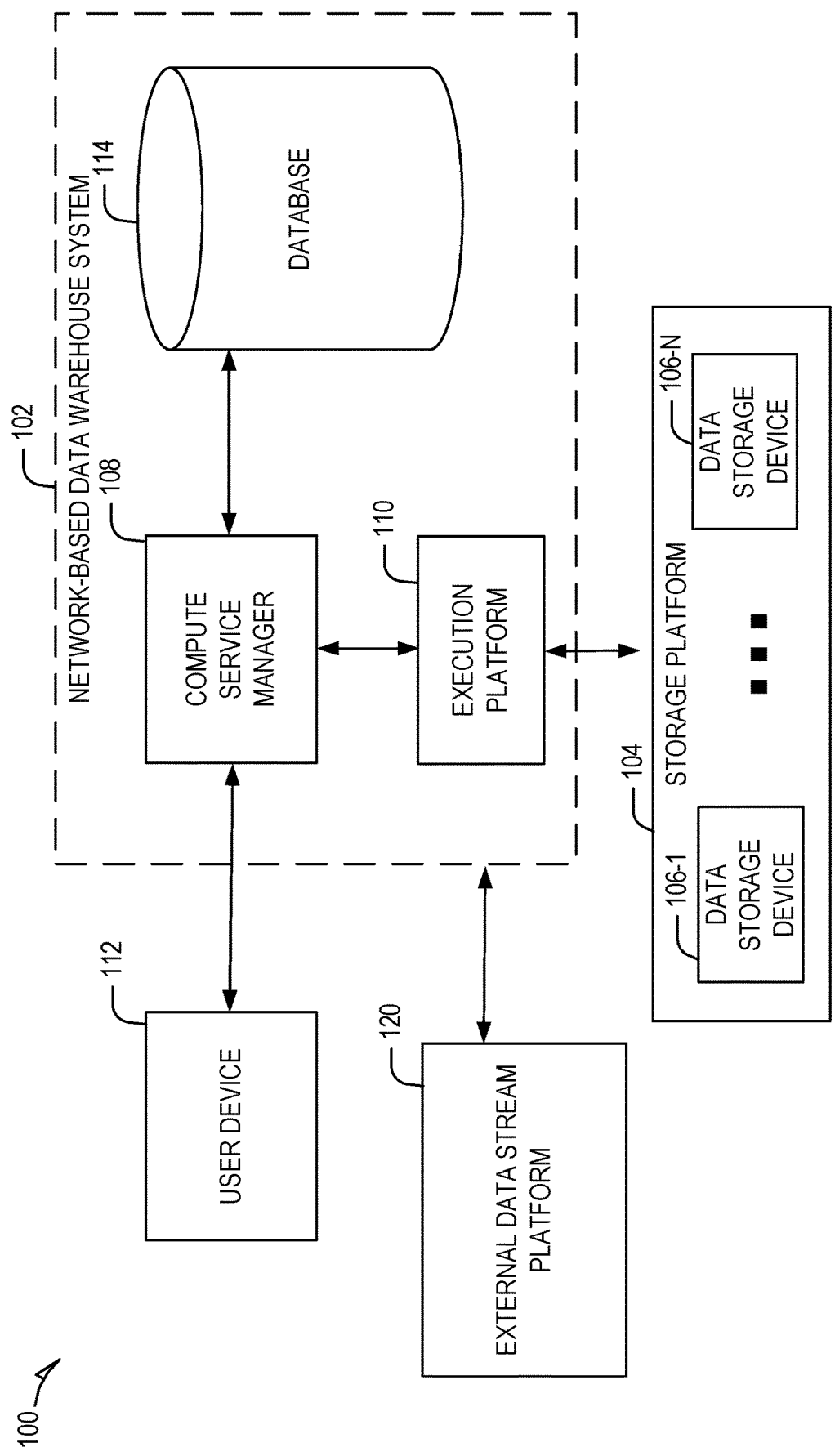
FIG. 1 illustrates an example computing environment that includes a network-based data warehouse system in communication with a storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, processing queries directed to very large tables is challenging because a significant amount of time and computing resources are required to scan an entire table to identify data that satisfies the query. Therefore, executing a query without scanning the entire table can result in performance improvements to a data warehouse system and improve latency for returning a result of the query. In some existing data warehouse systems, one approach is to provide support for table streams, which in an example can be implemented as objects that expose Change Data Capture (CDC) information from tables, views, and materialized views, and the like. Such CDC information represents salient changes to data including inserts, updates, and deletes, as well as metadata about each change. In particular, an individual table stream tracks the changes made to rows in a source table. A table stream (referred to herein as a "stream") generates a "change table" with information indicating changes, at the row level, between two transactional points of time in a table. When executing a query corresponding to a current transaction, the data warehouse system can utilize the stream to determine changes since a prior transaction (e.g., prior query). In this manner, the stream enables querying and consuming a sequence of change records in a transactional fashion, which provide a convenient way to continuously process new or changed data.

In today's expanding cloud computing environment, however, many users may process queries in different data sources (e.g., for extracting, transforming, and loading data into a new host source to perform data analytics on the data), sometimes across various storage platforms, which may be hosted by third parties. In some existing data warehouse systems, although streams for data may be provided, access to external data sources via streams is not supported. Aspects of the present disclosure address the above and other challenges in processing queries, in external data sources, by advantageously enabling the subject system to leverage streams of data provided in external data stream platforms. More specifically, as described in embodiments herein, an extensible stream, using a stream object, is implemented that facilitates performing an operation (e.g., read or write), in response to a query, on an external data stream platform in a transactional manner and to track the delta of changes in the external data source.

FIG. 1 illustrates an example computing environment 100 that includes a network-based data warehouse system 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the network-based data warehouse system 102 and a storage platform 104 (e.g., AWS®, Microsoft Azure Blob Storage®, or Google Cloud Storage®). The network-based data warehouse system 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the network-based data warehouse system 102.

The network-based data warehouse system 102 comprises a compute service manager 108, an execution platform 110, and a database 114. The network-based data warehouse system 102 hosts and provides services to multiple client accounts. Administrative users can create and manage identities (e.g., users, roles, and groups) and use permissions to allow or deny access to the identities to resources and services.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager is also in communication with a user device 112. The user device 112 corresponds to a user of one of the multiple client accounts supported by the network-based data-warehouse 102. In some embodiments, the compute service manager 108 does not receive any direct communications from the user device 112 and only receives communications concerning jobs from a queue within the network-based data warehouse system 102.

The compute service manager 108 is also coupled to database 114, which is associated with the data stored the computing environment 100. The database 114 stores data pertaining to various functions and aspects associated with the network-based data warehouse system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

For example, the database 114 can include information corresponding to a set of micro-partitions. As discussed herein, a "micro-partition" is a batch unit and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing, one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

In some embodiments, the compute service manager 108 may determine that a job should be performed based on data from the database 114. In such embodiments, the compute service manager 108 may scan the data and determine that a job should be performed to improve data organization or database performance. For example, the compute service manager 108 may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager 108 may determine that a job should be performed. In some embodiments, the compute service manager 108 determines that a job should be performed based on a trigger event and stores the job in a queue until the compute service manager 108 is ready to schedule and manage the execution of the job. In an embodiment of the disclosure, the compute service manager 108 determines whether a table or pruning index needs to be reclustered based on one or more DML commands being performed, wherein one or more of DML commands constitute the trigger event.

The compute service manager 108 is further coupled to the execution platform 110, which provides multiple computing resources that execute various data storage and data retrieval tasks. The execution platform 110 is coupled to storage platform 104 of the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3TM storage systems or any other data storage technology. Additionally, the storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the network-based data warehouse system 102 based on the changing data storage/retrieval needs as well as the changing needs of the users and systems. The support of dynamic changes allows the network-based data warehouse system 102 to scale quickly in response to changing demands on the systems and components within the network-based data warehouse system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, storage platform 104, and authentication and identity management system 118 are shown in FIG. 1 as individual discrete components. However, each of the compute service manager 108, database 114. execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

As further illustrated, the network-based data warehouse system 102 is enabled to communicate with an external data stream platform 120. In this example, the external data stream platform may be provided by a third party and accessible by one or more components of the network-based data warehouse system 102 (e.g., the compute service manager 108 and/or the execution platform 110). Some examples of such a data stream platform include Apache Flink®, Apache Kafka®, Amazon Kinesis®, Apache Pulsar® and the like. Such external data stream platforms provide external data sources which are then accessible by the components of the network-based data warehouse system 102. It is appreciated, however, that the subject technology can also implement aspects that utilize internal data sources for streams.

As mentioned herein, a stream object tracks data manipulation language (DML) changes made to tables, including inserts, updates, and deletes, as well as metadata about each change, so that actions can be taken using the changed data. This process is referred to as change data capture (CDC). An individual table stream tracks the changes made to rows in a source table. As mentioned before, a stream provides a "change table" indicating such changes, at the row level, between two transactional points of time in a table, thereby enabling querying and consuming a sequence of change records in a transactional manner.

In an embodiment, a stream maintains a point of time into the transactional versioned timeline of the source table, called an offset, which starts at the transactional point when the stream contents were last consumed using a DML statement. The stream can provide the set of changes from the current offset to the current transactional time of the source table (e.g., the current version of the table). In an example, the stream maintains the delta of the changes; if multiple DML statements change a row, the stream contains only the latest action taken on that row. In an embodiment, the offset is advanced (e.g., updated) when utilized in a transaction.

Figure 2:
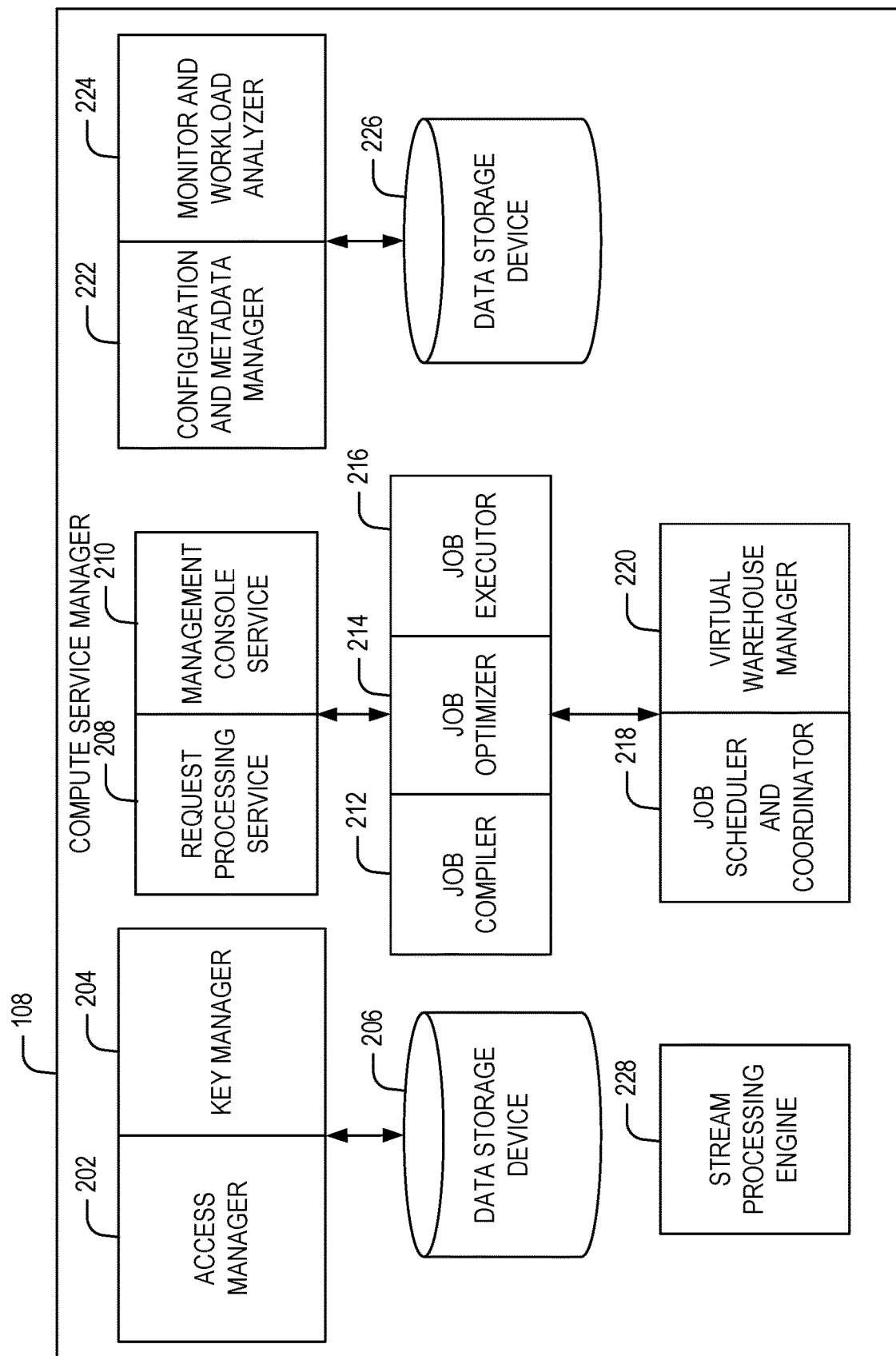
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices." Additionally, the access manager 202 handles authorization and authentication tasks for stream objects as discussed further herein.

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistribute tasks, as needed, based on changing workloads throughout the data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represent any data storage device within the data warehouse system 102. For example, data storage device 226 may represent caches in execution platform 110, storage devices in storage platform 104, or any other storage device.

As shown, the compute service manager 108 further includes a stream processing engine 228. In an embodiment, the stream processing engine 228 is responsible for generating and managing streams, which are implemented as objects that, in an example, expose change data capture (CDC) information from tables, views, materialized views (e.g., database objects that contain results of respective queries), and/or external tables. Further, the stream processing engine 228 is configured to support streams on external sources, such as the external data stream platform 120. Further details regarding the processing of streams with an external source are discussed further below.

Figure 3:
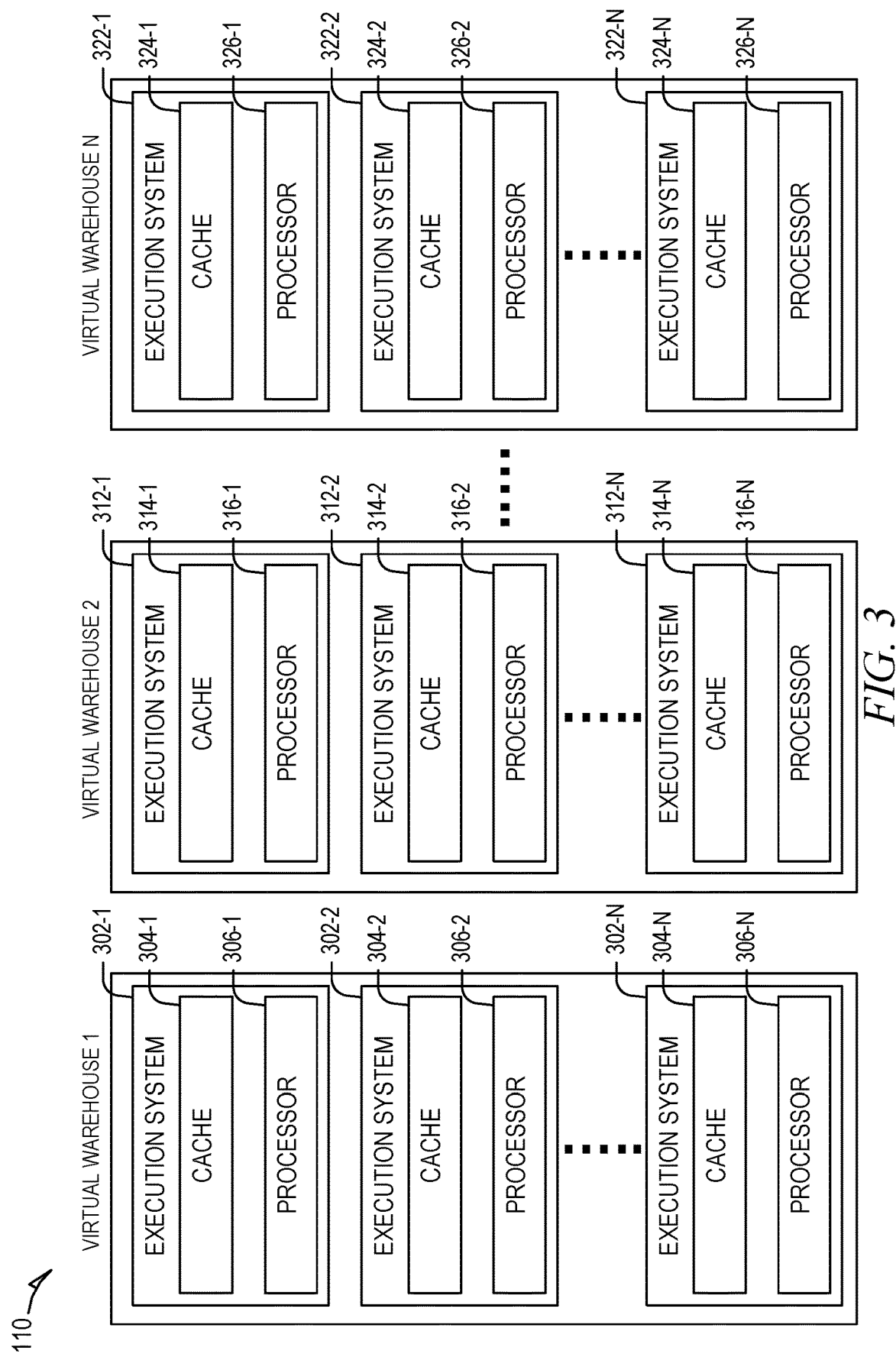
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 124-1 to 124-n and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

The following discussion relates to generating an extensible stream, in accordance to some embodiments. To provide interoperability with external sources, such as the external data stream platform 120, the stream processing engine 228 is configured to generate an extensible stream, which is utilized for responding to a query on the external data stream platform 120 as discussed further below. As discussed further below, a stream object may be utilized to represent an extensible stream and provides functions and/or methods for performing operations on an external data source, such as the external data stream platform 120, In an embodiment, the following example syntax (e.g., pseudocode statements) enables the stream processing engine 228 to generate an extensible stream and perform an additional operation(s) using the extensible stream:

CREATE [OR REPLACE] EXTENSIBLE STREAM STREAM_NAME
    LOAD_OFFSETS=load_offset_function(streamObj, action)
    LOAD_DATA=load_data_function(streamObj, partition_offset_pair, rowwriter)
    STORE_DATA=store_data_function(streamObject, rows, shard)
    [USING EXTERNAL INTEGRATION MY_EXTERNAL_INTEGRATION]

It is appreciated that above example syntax is one example and could be, in another example, be represented by a JAVA class implementing a certain interface contract corresponding to the following data contract:

The extensible stream implementation is able to retrieve the conceptual offset information from the stream data source. In the case of a Kafka® topic, this is a set of partition/offset pairs representing the point in the topic the information was retrieved last time. In addition, the user of the stream may specify this offset information with the AT clause illustrated below.

The extensible stream implementation has to be able to use this offset information and retrieve the data from the stream data source using the offset information. In addition to the streaming data, the new offset information has to be also returned which indicates how "far" the stream was read from. The extensible stream implementation has to be able to write data to the stream data source and return the success or failure of that operation.

In some embodiments, to provide further extensibility for streams, a JAVA JAR (JAVA Archive for aggregating files) providing a class implementing an interface, or a Python® library with a class with appropriate methods, may be provided and associated with the extensible stream.

In the above example syntax, the "LOAD_OFFSETS" corresponds to a user defined function (e.g., JavaScript® UDF or JS-UDF) that is called to load the offset information from a stream object as well as performing partition discovery on the external data stream platform 120 to determine new offsets. In an example, the "LOAD_OFFSETS" function accepts an object (e.g., JavaScript® object) representing the stream, and an action as a string (e.g., "STORE_DATA" or "LOAD_DATA"). Further, the aforementioned JavaScript® object provides a function (e.g., "getStreamOffsets") that provides a set of current offsets as a string, which may be implemented as blob data (e.g., JavaScript® object notation (JSON) blob), a comma delimited string, and the like. In an example, the set of offsets returned from the "getStreamOffsets" function can be specified by a user, or correspond to offsets from a previous time (e.g., the last time) that a read operation was performed using the stream and information related to the stream was stored after reading the stream (e.g., to update a last read offset, etc.). In an embodiment, the aforementioned function can be configured to provide new offsets instead of a current set of offsets.

In another embodiment, the stream processing engine 228 can determine a range of offsets and divide the offsets into separate sets. For example, when the stream processing engine 228 discovers a partition and an offset with a value of zero (0), but there is an indication of a high watermark (e.g., the offset of the last message that was successfully copied to all of the log's replicas) with a value of one hundred (100), the stream processing engine 228 can divide this partition into two (logical) sets, a first set that covers offsets zero (0) to fifty (50) and a second set from fifty one (51) to one hundred (100). As discussed herein, a particular partition can be associated with a particular offset, thus forming a partition/offset pair which is utilized for executing the stream. As referred to herein, execution of a stream corresponds to performing a transaction on the stream. In an example, when the transaction is completed, the offsets can be advanced to reflect the last read offset from the stream.

In another example, the stream processing engine 228 may not process all 50 available offsets, as discussed above, in each partition/offset pair when loading data. In this instance, the stream processing engine 228 stores two entries after successfully loading data, in which each entry has the same partition but different offset ranges representing the start and end offset (e.g., 35-50 and 85-100). The stream object behaves as an "out of order" stream in that the records returned when reading from the stream object may be out of order with respect to a logical ordering in the external data stream platform 120. In an example, the stream processing engine 228 may aggregate the two partition/offset pairs such that a new one is generated of partition: [35, 50, 85-100], which is intended for one unit of parallelism to process since the total number of offsets to process for that partition is relatively low.

In another example, the stream processing engine 228 determines that a new partition was created on the external data stream platform 120, or that two partitions were merged on the external data stream platform 120. In such an instance, the stream processing engine 228 generates a new partition/offset pair if a new partition was created, or aggregates two partitions into a single partition if the two partitions were merged.

As also mentioned above, the "LOAD_DATA" function corresponds to a function that reads data from the external data stream platform 120. In an embodiment, the stream processing engine 228 can execute an N number of this function in parallel, where N is determined from loading the partition/offset pairs. The LOAD_DATA" function receives the stream object and a shard/offset string that can be used in the function to make an external call. For instance, this shard/offset string could be a Kafka® partition/offset pair, or a Kinesis® shard/sequence number, The LOAD_DATA" function, when executed, provides a rowset (e.g., object that can be used as a table or a view), where the dimensions of this rowset can be based on a user configuration. Additionally, the LOAD_DATA" function, when executed, provides a string which indicates which partition/offset pair that was last read, among other types of information. For example, this could be the last offset that was processed for a partition (e.g., Kafka®), or could be a sequence number (e.g., Kinesis®).

As used herein, the term "shard" refers to a partition of data in a database. For example, in an implementation, a shard can correspond to a horizontal partition of data stored in a given database system. In some database systems, such shards can be referred to as partitions depending on the particular database system implementation (e.g., Kafka®). Further, a given shard can include a sequence of data records.

As also mentioned above, the stream processing engine 228 executes the "STORE_DATA" function to store the data in the external data stream platform 120. In an embodiment, the "STORE_DATA" function receives the stream object, an indication of which rows from the storage platform 104 to write, and optionally a shard to indicate that a specific shard is to be written in the external data stream platform 120. When executed, this function returns a Boolean indicating whether all rows were successfully stored in the external data stream platform 120.

As also mentioned above, "USING EXTERNAL INTEGRATION" represents an optional, external integration that can be utilized with initializing a connection to the external data stream platform 120, which may include security and configuration information that is different from offset information. Example configuration information may include a retry timeout, maximum number of offsets to process, request timeout, and the like.

In an embodiment, the string "EXTERNAL" is utilized signify that this integration is intended to be used with external sources, and a type of "USER_DEFINED" is utilized to indicate that the user is responsible for defining properties. Two reserved properties include ENABLED and SECRET_PROPERTIES. All options given are passed in and stored as key value pairs. The following pseudocode is an example:

---

CREATE EXTERNAL INTEGRATION MY_INTEGRATION
TYPE=USER_DEFINED
ENABLED = { TRUE | FALSE }
SECRET_PROPERTIES = [PROP1, PROP2]
PROP1 = VAL1
PROP2 = VAL2
PROPN = VAL2

---

In the above, ENABLED refers to a requirement in which an integration must be enabled before it can be used. If ENABLED is set to false, then this integration is not usable and reading from the stream fails prior to reaching any execution nodes.

In the above, SECRET_PROPERTIES is a list of secret and/or sensitive properties. For instance, OAuth client information is stored into SECRET_PROPERTIES. The SECRET_PROPERTIES are stored encrypted. Any property in this list will be stored securely, and the network-based data warehouse system 102 only shows the key name and a redacted property value when describing the integration.

In an embodiment, the network-based data warehouse system 102. implements a "CREDENTIALS" object that accepts a single strong (e.g., a JSON blob or other blob data), or a set of properties, for enabling an external integration for an extensible stream.

Figure 4:
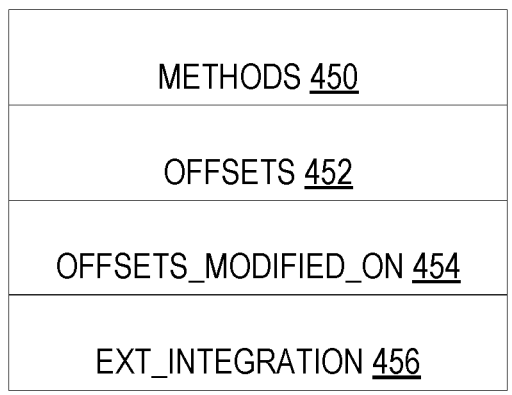
FIG. 4 is a conceptual diagram illustrating an example of a stream object for utilizing with an external data stream platform, in accordance with some example embodiments.

FIG. 4 is a conceptual diagram illustrating an example of a stream object 410 for utilizing with an external data stream platform (e.g., the external data stream platform 120), in accordance with some example embodiments.

As illustrated, the stream object 410 includes methods 450, and a set of properties corresponding to offsets 452, offsets modified 454, and an external integration 456. In an embodiment, the stream object 410 can be implemented as a JavaScript® object that represents a stream, and includes the following methods 450:

getOffsets( )—returns the currently stored sets of current offsets as a string storeOffsets(newOffsetInfo)—receives a string representing offsets and persists the offsets to the stream getExternalIntegration( )—provides the external integration (e.g., information indicating security and/or configuration information for connecting to the external data stream platform 120)

For the purpose of describing an extensible stream, the stream object 410 is illustrated as including a set of properties as shown in FIG. 4. It is appreciated, however, that in some embodiments such properties may be stored elsewhere in the network-based data warehouse system 102, such as in the storage platform 104 and/or the database 114, and associated with the stream object 410.

As further illustrated, in an embodiment, the stream object 410 includes a set of properties. For example, the offsets 452 corresponds to the stored offsets string as set on the stream. Further, offsets_modified_on 454 corresponds to the last time that the stream offset was modified. This property is updated each time the offsets on the stream get updated. The external integration 456 corresponds to a name of the external integration, if set, used by the stream object 410. Although not illustrated, in an example, a property indicating a version of the stream object 410 is provided to differentiate between different stream objects where the version can be incremented each time a successful set of operations is completed (e.g., read or write) using the external data stream platform 120.

In an embodiment, one or more properties of the stream object 410 may be modified. For example, the external integration 456 can be updated, and/or the offsets 452 can be overwritten. In an implementation, the offsets 452 may only be updated when there are no concurrent executions of a stream.

Figure 5:
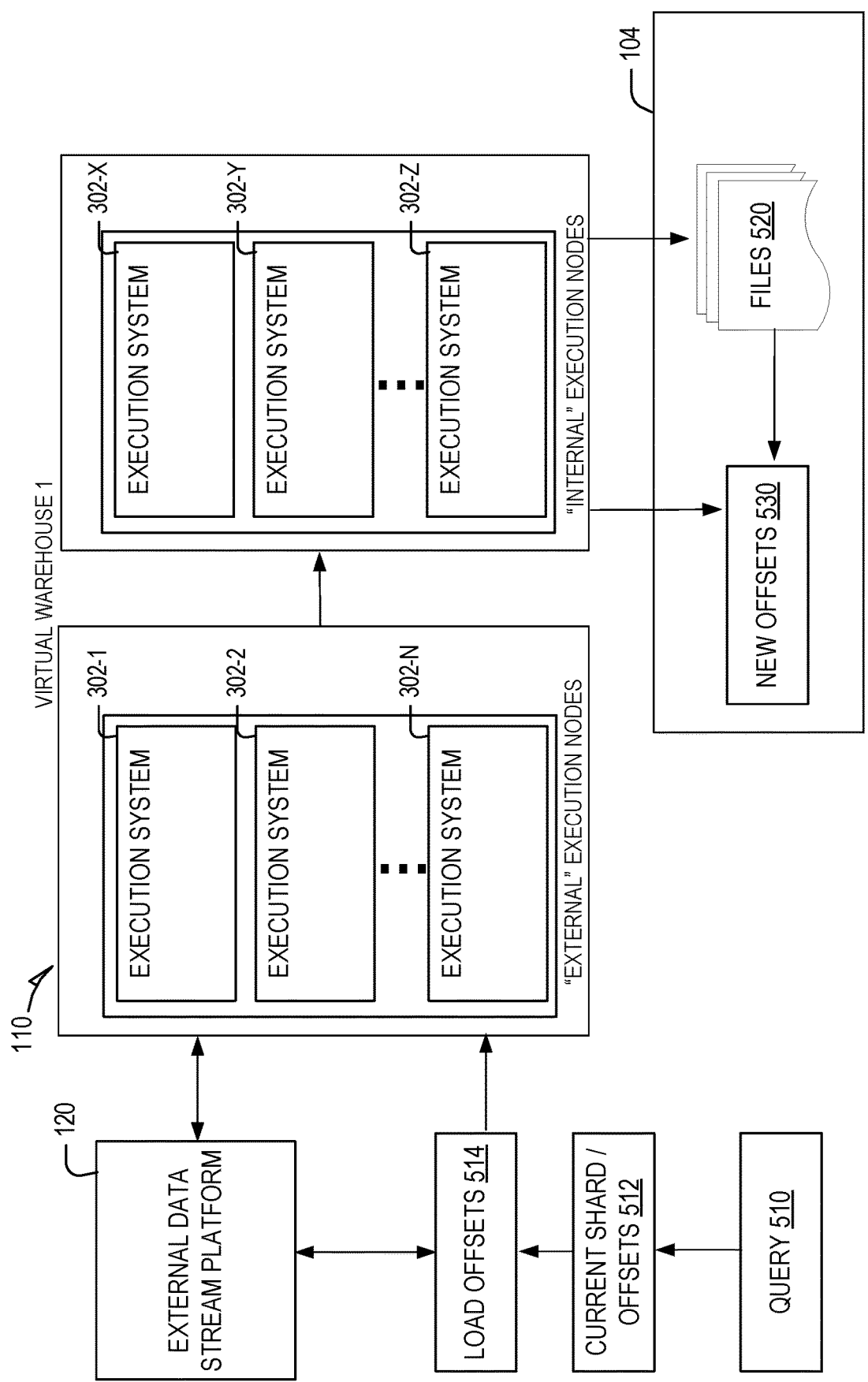
FIG. 5 is a conceptual diagram illustrating using an extensible stream for executing a query for reading data from an external data stream platform, in accordance with some example embodiments.

FIG. 5 is a conceptual diagram illustrating using an extensible stream for executing a query for reading data from an external data stream platform (e.g., the external data stream platform 120), in accordance with some example embodiments.

The following is example pseudocode for executing a read operation on an extensible stream:

```
SELECT ...
FROM STREAM_NAME ...
{
   <AT( { OFFSET => <time_difference> } ) >
   <USING EXTERNAL INTEGRATION INTEGRATION_NAME>
}
```

In the above example, the "AT" clause is optional since the stream uses the last offset that was advanced to when the stream was consumed (e.g., previously). The "USING" integration clause is also optional since the integration can be associated with the stream at a time when the stream is created.

As illustrated, a query 510 is received by the request processing service 208 of the compute service manager 108 which analyzes the query 510 and determines that the stream processing engine 228 should handle the query 510 as it relates to performing an operation on an extensible stream (e.g., SELECT * FROM STREAM STREAM_NAME). In this example, the query 510 includes a string corresponding to an extensible (external) stream (e.g., on the external data stream platform 120).

In an embodiment, prior to sending the query 510 to the stream processing engine 228, the access manager 202 performs an authorization check to determine that a corresponding user or client that submitted the query has authorization or sufficient privileges to execute the query 510.

After being authorized, the stream processing engine 228 determines the stream, and a security integration object associated with the query 510. In an example, a security integration object is utilized to generate access tokens to enable users to have access to the network-based data warehouse system 102.

The stream processing engine 228, using a stream object, determines a current shard (or partition in some embodiments)/offsets 512. As discussed before, the "LOAD_OFFSETS" function accepts an object (e.g., JavaScript® object) representing the stream in which the JavaScript® object provides a function (e.g., "getStreamOffsets") that provides a set of current offsets as a string. In an example, the set of offsets returned from the "getStreamOffsets" function can be specified by a user, or correspond to offsets from a previous time (e.g., the last time) that a read operation was performed using the stream object and information related to the stream object was stored to reflect the results of this read operation. Thus, this function determines offsets from a previous time that an extensible stream, corresponding to the stream object, was accessed during a prior transaction and the offsets from the previous time were previously stored upon completion of the prior transaction. Also, the aforementioned getStreamOffsets" function can be configured. to provide new offsets instead of a current set of offsets.

Using the current shard/offsets 512, the stream processing engine 228 then invokes a function 514 (e.g., "LOAD_OFFSETS") to load offsets on the external data stream platform 120 to determine a set of partition/offset pairs for loading (e.g., reading into the data warehouse system). In an example, a size of the set can determine a desired degree of parallelism (DoP) for performing the loading of such offsets. The external data stream platform 120 returns the set of partition/offset pairs to the stream processing engine 228.

In an embodiment, the stream processing engine 228 advantageously performs the loading of the set of partition/ offset pairs in a dynamic and scalable manner. For example, the subject system is capable of assigning computing resources and growing/shrinking such resources to handle the partition/offset loading as needed depending on an overall load. At query time, the subject system can perform the aforementioned operations dynamically such that the resources are not fixed.

The stream processing engine 228 generates a query plan (e.g., an ordered set of steps used to access data) and/or specification and description language (SDL) that indicates the requested DoP, based on the size of the aforementioned set of partitions, to the execution platform 110. Further, the stream processing engine 228 can include, in the query plan, a serialized stream and the security integration object to enable subsequent functions using the object.

In this example, the execution platform 110 processes the requested. DoP and launches a set of execution nodes from the execution nodes 302-1, 302-2, and 302-n based on the size of the virtual warehouse (e.g., "virtual warehouse 1" as shown). In an embodiment, the execution platform 110 can "slot" the partitions accordingly (e.g., one partition per processor). In an example, the execution platform provides mapping multiple partitions per processor. In this case, this is understood as being a DoP downgrade and the execution platform 110 then enables partition stealing such that if a processor is finished with processing its partitions and the processor determines that other nodes have un-processed partitions, the processor will grab one from another node that has yet to process the partition. In the case of a multicore processor, the above implementation can also be applied on a per-core basis, where such partition stealing is implemented at the core level for a multicore processor.

The set of execution nodes from the execution nodes 302-1, 302-2, and 302-n then invokes the external function (e.g., LOAD_DATA function) to retrieve the data accordingly from the external data stream platform 120. The set of execution nodes sends rows returned, from the external data stream platform 120, to a second set of execution nodes 302-X, 302-Y, and 302-Z, which then stores the rows returned in the storage platform 104. For purposes of illustration, three execution nodes are shown in the second set of execution nodes, but it is appreciated that more or fewer execution nodes in this second set can be utilized based on the configuration and/or capacity of the virtual warehouse.

At, this stage, the query 510 completes successfully. The execution platform 110 executes the "store offsets" function on the second set of execution nodes 302-X, 302-Y, and 302-Z, and sends that information corresponding to new offsets 530 to the storage platform 104 as a string for storing in files 520, which can correspond to respective micro-partitions provided by the storage platform 104. In an embodiment, when committing the transaction, the execution platform 110 stores the string on the stream as part of the transaction. Alternatively, the new offsets 530 are stored in an existing stream offset with a new field such as "externalOffset".

Figure 6:
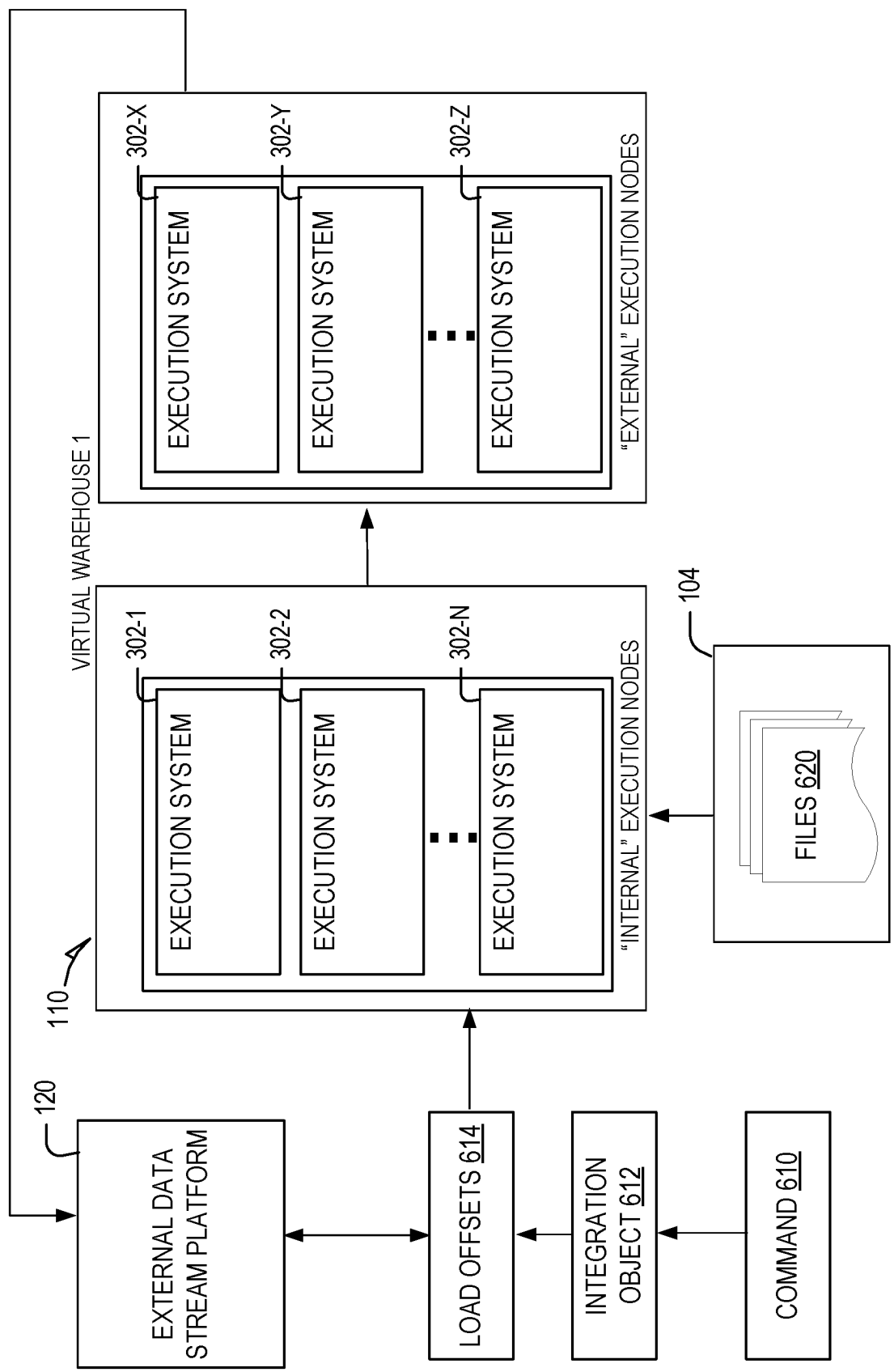
FIG. 6 is a conceptual diagram illustrating using an extensible stream for executing a command for storing data on an external data stream platform, in accordance with some example embodiments.

FIG. 6 is a conceptual diagram illustrating using an extensible stream for executing a query for storing data on an external data stream platform (e.g., the external data stream platform 120), in accordance with some example embodiments.

As illustrated, a command 610 is received by the request processing service 208 of the compute service manager 108 which analyzes the command 610 and determines that the stream processing engine 228 should handle the command 610 as it relates to performing an operation on an extensible stream (e.g., INSERT INTO EXTENSIBLE_EXTERNAL_

STREAM_NAME AS SELECT * FROM MY_TABLE). In this example, the command 610 includes a string corresponding to an extensible stream, and a name of a table stored in the storage platform 104.

In an embodiment, prior to sending the command 610 to the stream processing engine 228, the access manager 202 performs an authorization check to determine that a corresponding user or client that submitted the query has authorization or sufficient privileges to execute the command 610. After being authorized, the stream processing engine 228 determines the stream, and a security integration object 612 associated with the command 610.

The stream processing engine 228, using a stream object, executes a LOAD_OFFSETS function 614 to determine a set of destination shards (e.g., on the external data stream platform 120). The external data stream platform 120 returns the set of destination shards (e.g., partitions) to the stream processing engine 228. As DoP can be determined by a number of shards in the set of destination shards. This enables the execution platform 110 to parallelize data storing on the external data stream platform 120 (when supported by the external data stream platform 120). Given N number of shards, the execution platform 110 can distribute a set of rows being written to among N number of execution nodes.

The stream processing engine 228 generates a query plan (e.g., an ordered set of steps used to access data) and/or specification and description language (SDL) that indicates a requested DoP, based on the size of the aforementioned set of destination shards, to the execution platform 110. Further, the stream processing engine 228 can include, in the query plan, a serialized stream and the security integration object to enable subsequent functions using the object.

In this example, the execution platform 110 processes the requested DoP and launches a set of execution nodes from the execution nodes 302-1, 302-2, and 302-n based on the size of the virtual warehouse (e.g., "virtual warehouse 1" as shown). Based on the command 610 and/or the aforementioned query plan, the set of execution nodes from the execution nodes 302-1, 302-2, and 302-n reads data (e.g., rows from a table) from the storage platform 104. The execution nodes 302-1, 302-2, and 302-n forwards the data to a second set of execution nodes 302-X, 302-Y, and 302-Z, which are responsible for storing the data to the external data stream platform 120. For purposes of illustration, three execution nodes are shown in the second set of execution nodes, but it is appreciated that more or fewer execution nodes in this second set can be utilized based on the configuration and/or capacity of the virtual warehouse.

The second set of execution nodes 302-X, 302-Y, and 302-Z then invokes an external function (e.g., STORE_DATA function) for each shard, determined during executing the LOAD_OFFSETS function 614, to store the data accordingly to the external data stream platform 120. As mentioned before, when executed, the STORE_DATA function returns a Boolean indicating whether all rows were successfully stored in the external data stream platform 120. If the Boolean value is true, at this stage, the command 610 completes successfully, and the transaction is recorded as being committed in the storage platform 104. In an example, the command 610 can be rolled back if it is indicated (e.g., through a false value being returned instead) that the storing operation failed e.g., where the external data stream platform 120 is currently unavailable at this time, and it would. be beneficial to retry the command 610 at a subsequent time.

Although the above examples described in FIG. 5 and FIG. 6 involve an external data stream platform (e.g., with external data sources), the subject technology can be applied on internal data sources to advantageously provide streams for such internal data sources. In an embodiment, a user can define a stream on data provided within the network-based data warehouse system 102, such as a query history. In this example, a timestamp can be stored from the last time the query history was accessed (e.g., read), and the query history could be run with the timestamp in the stream, the resulting rows then processed, and the last time seen in query history is committed (e.g., stored), which is used as the offset in a subsequent time around. In this example, the system therefore can forgo defining a new stream for every internal catalog entity thereby enabling the user to perform such a task (e.g., defining the stream).

Figure 7:
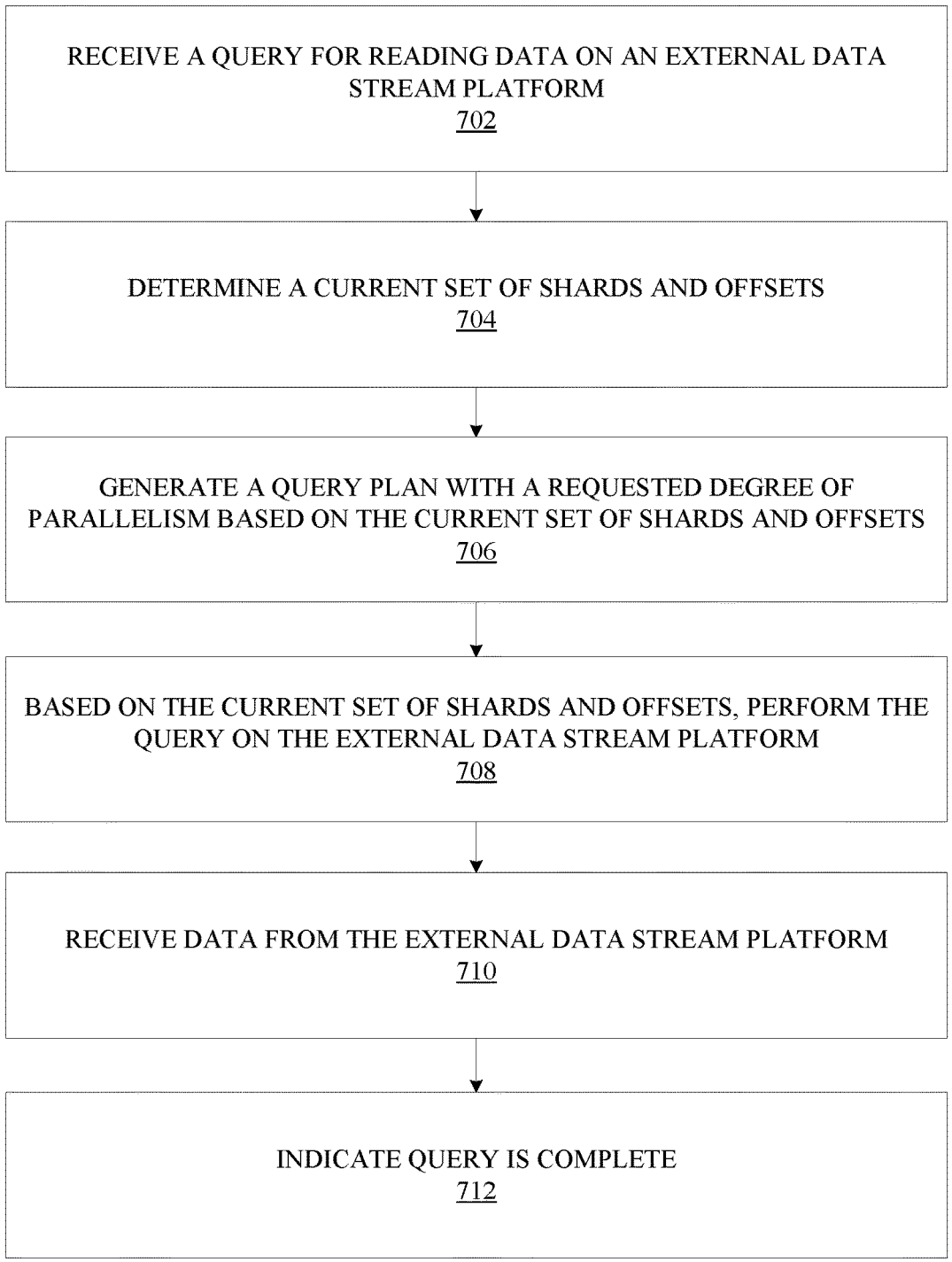
FIG. 7 is a flow diagram illustrating operations of the network-based data warehouse system in performing a method for reading data from an external data stream platform, in accordance with some embodiments of the present disclosure.

FIG. 7 is a flow diagram illustrating operations of the network-based data warehouse system 102 in performing a method 700 for reading data from an external data stream platform, in accordance with some embodiments of the present disclosure. The method 700 may be embodied in computer-readable instructions for execution by one or more hardware components (e.g., one or more processors) such that the operations of the method 700 may be performed by components of network-based data warehouse system 102. Accordingly, the method 700 is described below, by way of example with reference thereto. However, it shall be appreciated that the method 700 may be deployed on various other hardware configurations and is not intended to be limited to deployment within the network-based data warehouse system 102.

At operation 702, the stream processing engine 228 receives a query for reading data on an external data stream platform (e.g., the external data stream platform 120). In an example, as discussed before, the query can include a SELECT statement for reading data from the external data stream platform 120, which also specifies an extensible stream and an external integration (e.g., providing information for connecting to and accessing the external data stream platform 120).

At operation 704, the stream processing engine 228 determines a current set of shards and offsets based at least in part on the query (e.g., the specified extensible stream. The current set of shards and offsets, in an example, are in the form of respective shard/offset pairs, where a particular shard can be associated with a particular current offset, from a range of offsets. The current offset, in this example, can correspond to a last offset which was read from the extensible stream. Thus, the stream processing engine 228 can determine changes from this last offset to a current transactional time of a source table provided by the external data stream platform 120.

At operation 706, the stream processing engine 228 generates a query plan (e.g., a set of tasks for completing the query) with a requested degree of parallelism (DoP) based on the current set of shards and offsets. As mentioned before, the requested DoP can be based on a number of shards corresponding to the current set of shards and offsets.

At operation 708, the execution platform 110, based on the current set of shards and offsets, performs the query on the external data stream platform 120. As discussed before, the execution platform 110 processes the requested DoP and launches a set of execution nodes based on the size of the virtual warehouse. In an embodiment, the execution platform 110 can "slot" the shards accordingly (e.g., one shard per processor). The set of execution nodes invokes an external function (e.g., LOAD_DATA function) to retrieve the data accordingly from the external data stream platform 120.

At operation 710, the execution platform 110 receives data from the external data stream platform 120. The set of execution nodes sends rows returned, from the external data stream platform 120, to a second set of execution nodes, which then stores the rows returned in the storage platform 104.

At operation 712, the execution platform 110 indicates that the query is complete. In an embodiment, the execution platform 110 executes the "store offsets" function on the second set of execution nodes, and sends that information to the storage platform 104 as a string for storing in the storage platform 104. In an embodiment, when committing the transaction, the execution platform 110 stores the string on the stream as part of the transaction.

Figure 8:
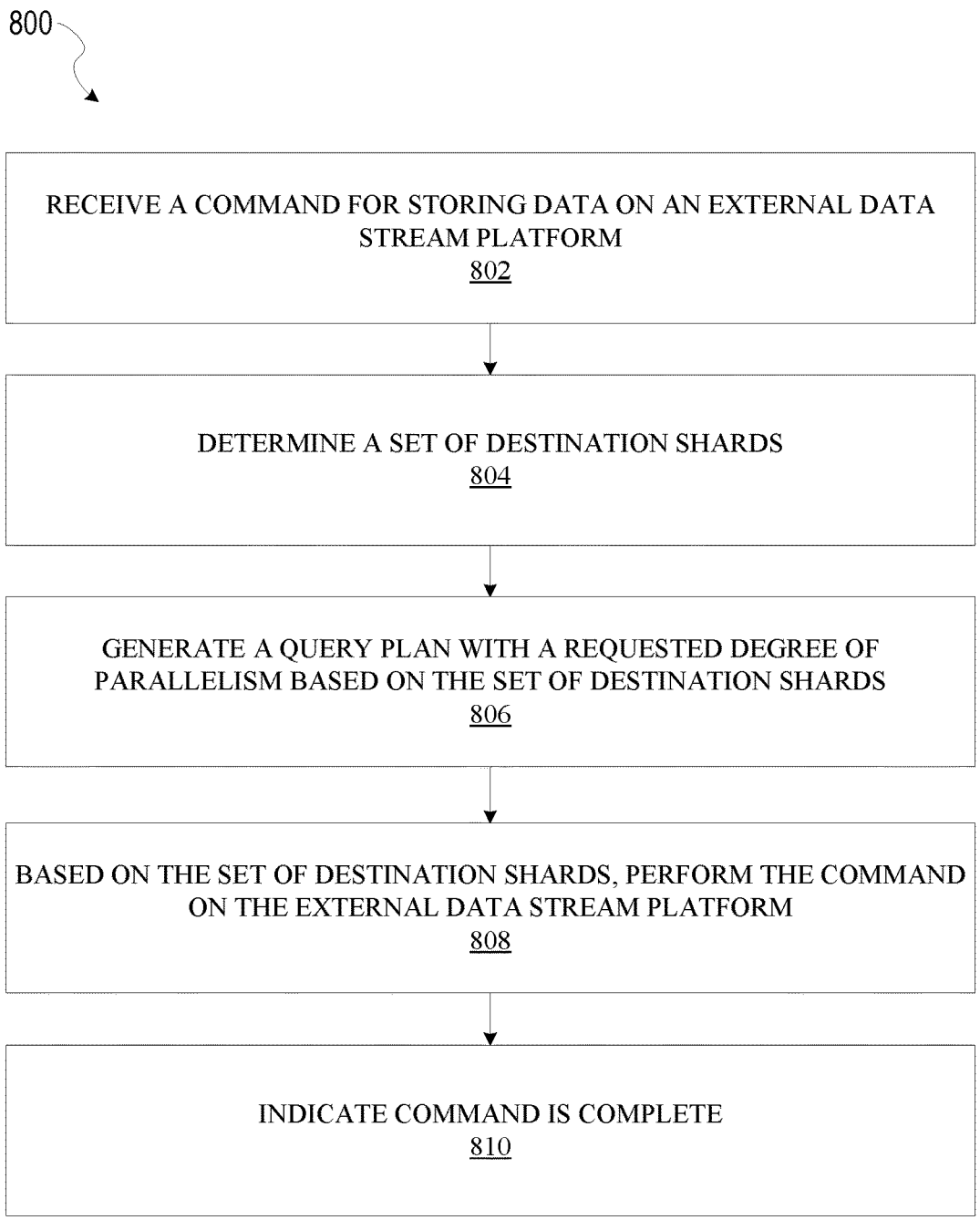
FIG. 8 is a flow diagram illustrating operations of the network-based data warehouse system in performing a method for storing data on an external data stream platform, in accordance with some embodiments of the present disclosure.

FIG. 8 is a flow diagram illustrating operations of the network-based data warehouse system 102 in performing a method 800 for storing data on an external data stream platform, in accordance with some embodiments of the present disclosure. The method 800 may be embodied in computer-readable instructions for execution by one or more hardware components (e.g., one or more processors) such that the operations of the method 800 may be performed by components of network-based data warehouse system 102. Accordingly, the method 800 is described below, by way of example with reference thereto. However, it shall be appreciated that the method 800 may be deployed on various other hardware configurations and is not intended to be limited to deployment within the network-based data warehouse system 102.

At operation 802, the stream processing engine 228 receives a command for storing data on an external data stream platform (e.g., the external data stream platform 120), In an example, the command can include a query statement with an INSERT command and a string corresponding to a table stored in the storage platform 104 for reading the data to be stored.

At operation 804, the stream processing engine 228 determines a set of destination shards on the external data stream platform 120. As mentioned before, the stream processing engine 228, using a stream object, executes a LOAD_OFFSETS function 614 to determine a set of destination shards (e.g., on the external data stream platform 120). The external data stream platform 120 returns the set of destination shards (e.g., partitions) to the stream processing engine 228.

At operation 806, the stream processing engine 228 generates a query plan (e.g., a set of tasks for completing the command) with a requested degree of parallelism (DoP) based on the set of destination shards. As mentioned before, the requested DoP can be based on a number of shards corresponding to the destination shards.

At operation 808, the execution platform 110, based on the set of destination shards, performs the command on the external data stream platform 120. As discussed before, the execution platform 110 processes the requested DoP and launches a set of execution nodes based on the size of the virtual warehouse. Based on the command and/or the aforementioned query plan, the set of execution nodes reads data (e.g., rows from a table) from the storage platform 104. The execution nodes forwards the data to a second set of execution nodes, which are responsible for storing the data to the external data stream platform 120. The second set of execution nodes then invokes an external function (e.g., STORE_DATA function) for each destination shard to store the data accordingly to the external data stream platform 120.

At operation 810, the execution platform 110 indicates that the command is complete. As mentioned before, when executed, the STORE_DATA function returns a Boolean indicating whether all rows were successfully stored in the external data stream platform 120. If the Boolean value is true, at this stage, the command 610 completes successfully, and the transaction is recorded as being committed in the storage platform 104.

Figure 9:
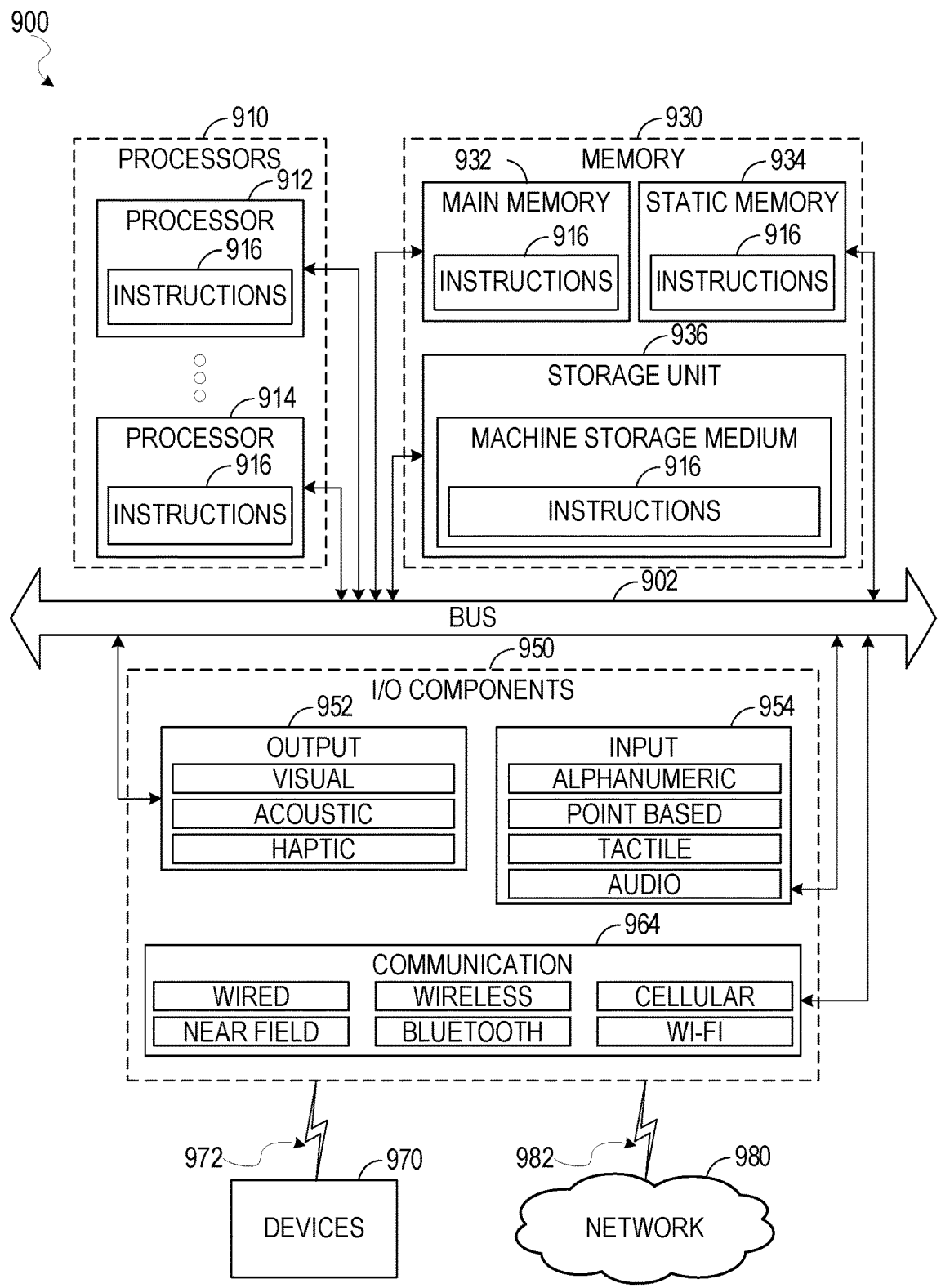
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment, Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described above. As another example, the instructions 916 may cause the machine 900 to implement portions of the functionality illustrated in any one or more of FIGS. 1-8. In this way, the instructions 916 transform a general, non-programmed machine into a particular machine 900 (e.g., the compute service manager 108, the execution platform 110, and the user device 112) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the compute service manager 108, the execution platform 110, and the devices 970 may include the user device 112 or any other computing device described herein as being in communication with the network-based data warehouse system 102 or the storage platform 104.

Executable Instructions and Machine Storage Medium

The various memories (e.g., 1430, 1432, 1434, and/or memory of the processor(s) 1410 and/or the storage unit 1436) may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 300 and 400 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

EXAMPLES

Example 1 is a network-based database system comprising: at least one hardware processor; and a memory storing instructions that cause the at least one hardware processor to perform operations comprising: determining a set of shards corresponding to an external data source accessible via a network, the external data source being hosted by an external system separate from the network-based database system; determining, using a stream object, a set of offsets of each shard of the set of shards; identifying an operation to perform on the set of shards, the operation comprising a read operation or a write operation; and based on the set of shards and the set of offsets, performing the operation on the external data source.

In Example 2 the subject matter of Example 1 wherein each shard of the set of shards optionally comprises a sequence of data records stored by the external data source In Example 3, the subject matter of any one of Examples 1 and 2 wherein determining the set of offsets of each shard of the set of shards optionally comprises: executing a user defined function included in the stream object to determine the set of offsets.

In Example 4, the subject matter of any one of Examples 1-3 wherein the user defined function, when executed, optionally determines offsets from a previous time that an extensible stream, corresponding to the stream object, was accessed during a prior transaction and the offsets from the previous time were previously stored upon completion of the prior transaction/

In Example 5, the subject matter of any one of Examples 1-4 wherein the operations optionally further comprise determining a set of new offsets subsequent to the previous time that the extensible stream was accessed.

In Example 6, the subject matter of any one of Examples 1-5 wherein the operations optionally further comprise: determining that a new shard was created subsequent to the previous time that the extensible stream was accessed; determining a new offset corresponding to the new shard; and providing the new offset with the set of new offsets.

In Example 7, the subject matter of any one of Examples 1-6 wherein the operations optionally further comprise: determining that a number of offsets correspond to a particular shard from the set of shards; dividing the particular shard from the set of shards into at least two shards; and accessing a first shard prior to accessing a second shard from the at least two shards.

In Example 8, the subject matter of any one of Examples 1-7 wherein the user defined function, when executed, optionally requests data from the external data source based at least in part on the set of shards and the set of offsets.

In Example 9, the subject matter of any one of Examples 1-8 wherein the user defined function optionally requests data using a set of parallel operations based on the set of shards.

In Example 10, the subject matter of any one of Examples 1-9 wherein the stream object optionally comprises: a first function providing a set of stored offsets; a second function storing a second set of offsets; and a third function providing an integration with an external object that enables communication with the external data source.

In Example 11, the subject matter of any one of Examples 1-10 wherein the external data source optionally comprises an external data stream platform.

Example 12 is a method comprising: determining, using at least one hardware processor, a set of shards corresponding to an external data source accessible via a network, the external data source being hosted by an external system separate from a network-based database system; determining, using a stream object, a set of offsets of each shard of the set of shards; identifying an operation to perform on the set of shards, the operation comprising a read operation or a write operation; and based on the set of shards and the set of offsets, performing the operation on the external data source.

In Example 13, the subject matter of Examiner 12 wherein each shard of the set of shards optionally comprises a sequence of data records stored by the external data source.

In Example 14, the subject matter of Examples 12-13 wherein determining the set of offsets of each shard of the set of shards optionally comprises: executing a user defined function included in the stream object to determine the set of offsets.

In Example 15, the subject matter of any one of Examples 12-14 wherein the user defined function, when executed, optionally determines offsets from a previous time that an extensible stream, corresponding to the stream object, was accessed during a prior transaction and the offsets from the previous time were previously stored upon completion of the prior transaction.

In Example 16, the subject matter of any one of Examples 12-15 further optionally comprising determining a set of new offsets subsequent to the previous time that the extensible stream was accessed.

In Example 17, the subject matter of any one of Examples 12-16 further optionally comprising: determining that a new shard was created subsequent to the previous time that the extensible stream was accessed; determining a new offset corresponding to the new shard; and providing the new offset with the set of new offsets.

In Example 18, the subject matter of any one of Examples 12-17 further optionally comprising determining that a number of offsets correspond to a particular shard from the set of shards; dividing the particular shard from the set of shards into at least two shards; and accessing a first shard prior to accessing a second shard from the at least two shards.

In Example 19, the subject matter of any one of Examples 12-18 wherein the user defined function, when executed, optionally requests data from the external data source based at least in part on the set of shards and the set of offsets, and the user defined function requests data using a set of parallel operations based on the set of shards.

In Example 20 is non-transitory computer-storage medium comprising instructions that, when executed by a processor, configure the processor to perform operations comprising determining a set of shards corresponding to an external data source accessible via an electronic network, the external data source being hosted by an external system separate from a network-based database system; determining, using a stream object, a set of offsets of each shard of the set of shards; identifying an operation to perform on the set of shards, the operation comprising a read operation or a write operation; and based on the set of shards and the set of offsets, performing the operation on the external data source.

In Example 21, the subject matter of Example 20 wherein each shard of the set of shards optionally comprises a sequence of data records stored by the external data source.

In Example 22, the subject matter of Examples 20-21 wherein determining the set of offsets of each shard of the set of shards optionally comprises: executing a user defined function included in the stream object to determine the set of offsets.

In Example 23, the subject matter of Examples 20-22 wherein the user defined function, when executed, optionally determines offsets from a previous time that an extensible stream, corresponding to the stream object, was accessed during a prior transaction and the offsets from the previous time were previously stored upon completion of the prior transaction.

In Example 24, the subject matter of Example 20-23 wherein the operations further optionally comprise: determining a set of new offsets subsequent to the previous time that the extensible stream was accessed.

In Example 25, the subject matter of Example 20-24 wherein the operations optionally further comprise: determining that a new shard was created subsequent to the previous time that the extensible stream was accessed; determining a new offset corresponding to the new shard; and providing the new offset with the set of new offsets.

In Example 26, the subject matter of Example 20-25 wherein the operations further optionally comprise: determining that a number of offsets correspond to a particular shard from the set of shards; dividing the particular shard from the set of shards into at least two shards; and accessing a first shard prior to accessing a second shard from the at least two shards.

In Example 27, the subject matter of Example 20-26 wherein the user defined function, when executed, optionally requests data from the external data source based at least in part on the set of shards and the set of offsets.

In Example 28, the subject matter of Example 20-27 wherein the user defined function optionally requests data using a set of parallel operations based on the set of shards.

In Example 29, the subject matter of Example 20-28 wherein the user defined function, when executed, optionally stores data into the external data source based at least in part on a particular shard from the set of shards, and a set of rows from an internal data source to store in the particular shard.

In Example 30, the subject matter of Example 20-29 wherein the stream object optionally comprises: a first function providing a set of stored offsets; a second function storing a second set of offsets; and a third function providing an integration with an external object that enables communication with the external data source.

The invention claimed is:

1. A system comprising:
   at least one hardware processor; and
   a memory storing instructions that cause the at least one hardware processor to perform operations comprising:
   determining, using a stream object provided by a network-based database system separate from an external system, a set of offsets of each shard of a set of shards, the set of offsets being determined by executing a user defined function (UDF) included in the stream object, the stream object and the UDF being implemented in a particular programming language different than a database query language;
   identifying an operation to perform on the set of shards;
   based on the set of shards and the set of offsets, performing, using the UDF included in the stream object, the operation on an external data source hosted by the external system; and
   incrementing a property indicating a different version of the stream object after performing the operation on the external data source, the property being included in the stream object.

2. The system of claim 1, wherein the stream object comprises:
   a first function providing a set of stored offsets;
   a second function storing a second set of offsets; and
   a third function providing an integration with an external object that enables communication with the external data source.

3. The system of claim 1, wherein the operations further comprise:
   determining the set of shards corresponding to the external data source accessible via a network, the external data source being hosted by the external system separate from the network-based database system.

4. The system of claim 1, wherein the stream object is used by the network-based database system to represent an extensible stream, the UDF when executing performs at least one operation to read information from the external data source hosted by the external system, and
   each shard of the set of shards comprises a sequence of data records stored by the external data source.

5. The system of claim 1, wherein the user defined function, when executed, determines offsets from a previous time that an extensible stream, corresponding to the stream object, was accessed during a prior transaction and the offsets from the previous time were previously stored upon completion of the prior transaction.

6. The system of claim 5, wherein the operations further comprise:
   determining a set of new offsets subsequent to the previous time that the extensible stream was accessed.

7. The system of claim 6, wherein the operations further comprise:
   determining that a new shard was created subsequent to the previous time that the extensible stream was accessed;
   determining a new offset corresponding to the new shard; and
   providing the new offset with the set of new offsets.

8. The system of claim 1, wherein the operations further comprise:
   determining that a number of offsets correspond to a particular shard from the set of shards;
   dividing the particular shard from the set of shards into at least two shards; and
   accessing a first shard prior to accessing a second shard from the at least two shards.

9. The system of claim 1, wherein the stream object provides at least one function implemented in the particular programming language for performing at least one operation on the external data source separate from the network-based database system.

10. The system of claim 1, wherein the stream object comprises, as defined in the particular programming language, at least one property including a stored offsets string, a last time that a stream offset was modified, and a name of external integration including information indicating security information for connecting to the external data source.

11. A method comprising:
    determining, using a stream object provided by a network-based database system separate from an external system, a set of offsets of each shard of a set of shards, the set of offsets being determined by executing a user defined function (UDF) included in the stream object, the stream object and the UDF being implemented in a particular programming language different than a database query language;
    identifying an operation to perform on the set of shards;
    based on the set of shards and the set of offsets, performing, using the UDF included in the stream object, the operation on an external data source hosted by the external system; and
    incrementing a property indicating a different version of the stream object after performing the operation on the external data source, the property being included in the stream object.

12. The method of claim 11, wherein the stream object comprises:
    a first function providing a set of stored offsets;
    a second function storing a second set of offsets; and
    a third function providing an integration with an external object that enables communication with the external data source.

13. The method of claim 11, further comprising:
    determining the set of shards corresponding to the external data source accessible via a network, the external data source being hosted by the external system separate from the network-based database system.

14. The method of claim 11, wherein the stream object is used by the network-based database system to represent an extensible stream, the UDF when executing performs at least one operation to read information from the external data source hosted by the external system, and
    each shard of the set of shards comprises a sequence of data records stored by the external data source.

15. The method of claim 11, wherein the user defined function, when executed, determines offsets from a previous time that an extensible stream, corresponding to the stream object, was accessed during a prior transaction and the offsets from the previous time were previously stored upon completion of the prior transaction.

16. The method of claim 15, further comprising:
    determining a set of new offsets subsequent to the previous time that the extensible stream was accessed.

17. The method of claim 16, further comprising:
    determining that a new shard was created subsequent to the previous time that the extensible stream was accessed;
    determining a new offset corresponding to the new shard; and
    providing the new offset with the set of new offsets.

18. The method of claim 11. further comprising:
determining that a number of offsets correspond to a particular shard from the set of shards;
dividing the particular shard from the set of shards into at least two shards; and
accessing a first shard prior to accessing a second shard from the at least two shards.

19. The method of claim 11, wherein the stream object provides at least one function implemented in the particular programming language for performing at least one operation on the external data source separate from the network-based database system.

20. The method of claim 11, wherein the stream object comprises, as defined in the particular programming language, at least one property including a stored offsets string, a last time that a stream offset was modified, and a name of external integration including information indicating security information for connecting to the external data source.

21. A non-transitory computer-storage medium comprising instructions that, when executed by a processing device, configure the processing device to perform operations comprising:
determining, using a stream object provided by a network-based database system separate from an external system, a set of offsets of each shard of a set of shards, the set of offsets being determined by executing a user defined function (UDF) included in the stream object, the stream object and the UDF being implemented in a particular programming language different than a database query language;
identifying an operation to perform on the set of shards;
based on the set of shards and the set of offsets, performing, using the UDF included in the stream object, the operation on an external data source hosted by the external system; and
incrementing a property indicating a different version of the stream object after performing the operation on the external data source, the property being included in the stream object.

22. The non-transitory computer-storage medium claim 21, wherein the stream object comprises:
a first function providing a set of stored offsets;
a second function storing a second set of offsets; and
a third function providing an integration with an external object that enables communication with the external data source.

23. The non-transitory computer-storage medium claim 21, wherein the operations further comprise:
determining the set of shards corresponding to the external data source accessible via a network, the external data source being hosted by the external system separate from the network-based database system.

24. The non-transitory computer-storage medium claim 21, wherein the stream object is used by the network-based database system to represent an extensible stream, the UDF when executing performs at least one operation to read information from the external data source hosted by the external system, and
each shard of the set of shards comprises a sequence of data records stored by the external data source.

25. The non-transitory computer-storage medium claim 21, wherein the user defined function, when executed, determines offsets from a previous time that an extensible stream, corresponding to the stream object, was accessed during a prior transaction and the offsets from the previous time were previously stored upon completion of the prior transaction.

26. The non-transitory computer-storage medium claim 25, wherein the operations further comprise:
determining a set of new offsets subsequent to the previous time that the extensible stream was accessed.

27. The non-transitory computer-storage medium claim 26, wherein the operations further comprise:
determining that a new shard was created subsequent to the previous time that the extensible stream was accessed;
determining a new offset corresponding to the new shard; and
providing the new offset with the set of new offsets.

28. The non-transitory computer-storage medium claim 21, wherein the operations further comprise:
determining that a number of offsets correspond to a particular shard from the set of shards;
dividing the particular shard from the set of shards into at least two shards; and
accessing a first shard prior to accessing a second shard from the at least two shards.

29. The non-transitory computer-storage medium claim 21, wherein the stream object provides at least one function implemented in the particular programming language for performing at least one operation on the external data source separate from the network-based database system.

30. The non-transitory computer-storage medium claim 21, wherein stream object comprises, as defined in the particular programming language, at least one property including a stored offsets string, a last time that a stream offset was modified, and a name of external integration including information indicating security information for connecting to the external data source.

* * * * *

UNITED STATES PATENT AND TRADEMARK OFFICE
CERTIFICATE OF CORRECTION

PATENT NO. : 11,216,421 B2
APPLICATION NO. : 17/345422
DATED : January 4, 2022
INVENTOR(S) : Cseri et al.

Page 1 of 1

It is certified that error appears in the above-identified patent and that said Letters Patent is hereby corrected as shown below:

In the Claims

In Column 29, Line 1, in Claim 18, delete "11." and insert --11,-- therefor

In Column 29, Line 41, in Claim 22, after "medium", insert --of--

In Column 29, Line 48, in Claim 23, after "medium", insert --of--

In Column 30, Line 3, in Claim 24, after "medium", insert --of--

In Column 30, Line 11, in Claim 25, after "medium", insert --of--

In Column 30, Line 18, in Claim 26, after "medium", insert --of--

In Column 30, Line 22, in Claim 27, after "medium", insert --of--

In Column 30, Line 30, in Claim 28, after "medium", insert --of--

In Column 30, Line 38, in Claim 29, after "medium", insert --of--

In Column 30, Line 43, in Claim 30, after "medium", insert --of--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*